US012801292B2

(12) United States Patent
Upadhyay et al.

(10) Patent No.: US 12,801,292 B2
(45) Date of Patent: Nov. 17, 2026

(54) SEGMENTED CURRENT SENSE COMPARATOR METHOD FOR EFFICIENT PROGRAMMING

(71) Applicant: SK hynix Inc., Gyeonggi-do (KR)

(72) Inventors: Sagar Rajendrabhai Upadhyay, San Jose, CA (US); Hang Tian, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 108 days.

(21) Appl. No.: 19/056,754

(22) Filed: Feb. 19, 2025

(65) Prior Publication Data

US 2026/0244348 A1 Aug. 20, 2026

(51) Int. Cl.
*G06F 3/06* (2006.01)

(52) U.S. Cl.
CPC .......... *G06F 3/0619* (2013.01); *G06F 3/0653* (2013.01); *G06F 3/0679* (2013.01)

(58) Field of Classification Search
CPC .... G06F 3/0679; G06F 3/0619; G06F 3/0653; G06F 11/008; G06F 11/073
See application file for complete search history.

(56) References Cited

U.S. PATENT DOCUMENTS

| | | | | |
|---|---|---|---|---|
| 7,545,692 | B2 * | 6/2009 | Jang | G11C 29/02 365/201 |
| 8,654,590 | B2 | 2/2014 | Aritome et al. | |
| 8,923,056 | B2 | 12/2014 | Kim | |
| 11,887,669 | B2 | 1/2024 | Choi | |
| 2013/0088919 | A1 * | 4/2013 | Kim | G11C 16/3459 365/185.12 |
| 2022/0036950 | A1 * | 2/2022 | Choi | G11C 11/5671 |
| 2024/0185932 | A1 | 6/2024 | Joo | |

* cited by examiner

*Primary Examiner* — Khoa D Doan
(74) *Attorney, Agent, or Firm* — IP&T GROUP LLP

(57) ABSTRACT

A method for programming memory cells in a memory and the associated memory system. The method applies a series of program pulses with increasing magnitude to control gates of the memory cells, and compares threshold voltages of the memory cells with specific program verify levels by sensing, at the specific program verify levels, a page buffer current in a page buffer, wherein the page buffer current is drawn from a first group of the memory cells segmented from a second group of the memory cells. The method further determines a number of the memory cells in the first group that failed to program based on the page buffer current drawn from the first group, and based on the number of the memory cells that failed to program in the first group, determines a total number of failed memory cells in the memory.

20 Claims, 13 Drawing Sheets

600

$$H = \begin{bmatrix} 1 & 0 & 1 & 0 & 0 & 1 \\ 1 & 1 & 0 & 0 & 1 & 0 \\ 1 & 0 & 0 & 1 & 0 & 0 \\ 0 & 1 & 0 & 1 & 0 & 1 \end{bmatrix}$$

SEGMENTED CURRENT SENSE COMPARATOR METHOD FOR EFFICIENT PROGRAMMING

BACKGROUND

1. Field

Embodiments of the present disclosure relate to memory systems, and methods of operating such systems, particularly to the operation of solid state drives.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller which includes the electronics that bridge the flash memory components to the SSD input/output (I/O) interfaces. The SSD controller can include an embedded processor that can execute functional components such as firmware (FW). The SSD functional components are device specific, and in most cases, can be updated.

The two main types of flash memory components are named after the NAND and NOR logic gates. The individual flash memory cells exhibit internal characteristics similar to those of their corresponding gates. The NAND-type flash memory may be written and read in blocks (or pages) which are generally much smaller than the entire memory space. The NOR-type flash memory allows a single machine word (byte) to be written to an erased location or read independently. The NAND-type flash memory operates primarily in memory cards, USB flash drives, solid-state drives, and similar products, for general storage and transfer of data.

NAND flash-based storage devices have been widely adopted because of their faster read/write performance, lower power consumption, and shock proof features. In general, however, they are more expensive compared to hard disk drives (HDD). To bring costs down, NAND flash manufacturers have been pushing the limits of their fabrication processes towards 20 nm and lower, which often leads to a shorter usable lifespan and a decrease in data reliability or Quality of Service.

In this context, embodiments of the present invention arise.

SUMMARY

Aspects of the present invention include a method for programming memory cells in a memory, where the method applies a series of program pulses with increasing magnitude to control gates of the memory cells, and compares threshold voltages of the memory cells with specific program verify levels by sensing, at the specific program verify levels, a page buffer current in a page buffer, wherein the page buffer current is drawn from a first group of the memory cells segmented from a second group of the memory cells. The method further determines a number of the memory cells in the first group that failed to program based on the page buffer current drawn from the first group, and based on the number of the memory cells that failed to program in the first group, determines a total number of failed memory cells in the memory.

Further aspects of the present invention include a memory system comprising a memory device; a page buffer; a comparator configured to sense page-buffer current and compare the page-buffer current to a reference current; and a controller in communication with and configured to control the memory device, the page buffer, and the comparator. The controller is configured to: apply a series of program pulses with increasing magnitude to control gates of the memory cells; compare threshold voltages of the memory cells with specific program verify levels by sensing, at the specific program verify levels, the page buffer current in the page buffer, wherein the page buffer current is drawn from a first group of the memory cells segmented from a second group of the memory cells; determine a number of the memory cells in the first group that failed to program based on the page buffer current drawn from the first group; and based on the number of the memory cells that failed to program in the first group, determine a total number of failed memory cells in the memory.

Other features, aspects and advantages of the present invention will become clear in view of the following description and accompanying the drawings.

DETAILED DESCRIPTION

Figure 1:
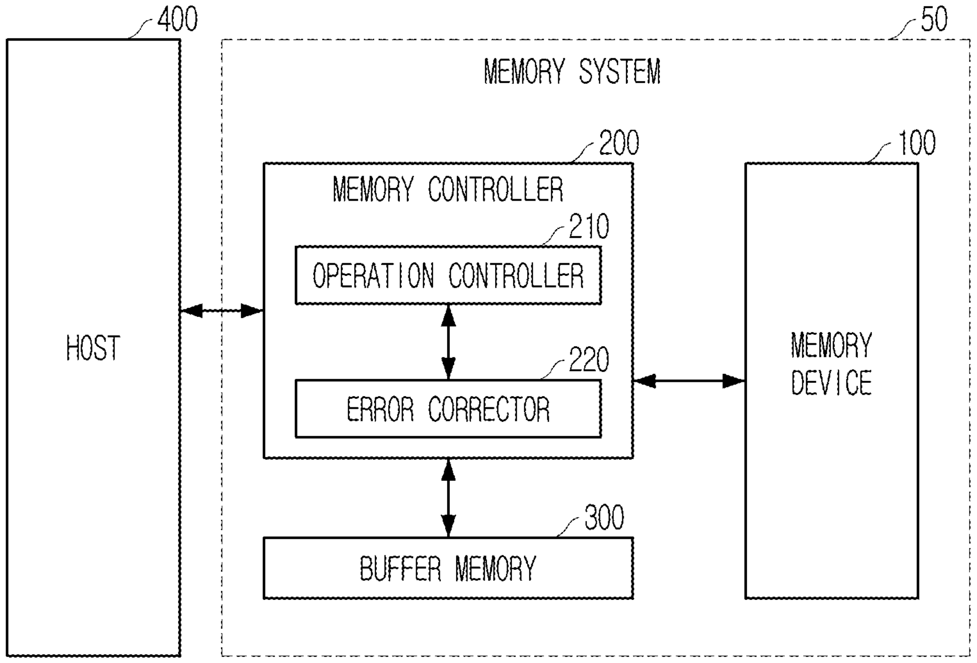
FIG. 1 is a diagram illustrating a memory system according to an embodiment of the present disclosure.

Various embodiments are described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrases is not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a diagram illustrating a memory system according to an embodiment of the present disclosure. Referring to FIG. 1, the memory system 50 may include a memory device 100, a memory controller 200, and a buffer memory 300. The memory system 50 may be a device that stores data under the control of a host 400 such as a cellular phone, a smartphone, an MP3 player, a laptop computer, a desktop computer, a game player, a TV, a tablet PC, or an in-vehicle infotainment system.

The memory system 50 may be manufactured as one of various types of storage devices according to a host interface that is a communication method with the host 400. For example, the memory system 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The memory system 50 may be manufactured as any of various types of packages. For example, the memory system 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may operate under the control of the memory controller 200. The memory device 100 may include a memory cell array (not shown) including a plurality of memory cells that store data.

In one embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

The memory device 100 may be configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. The memory device 100 may program, read, or erase data in the area selected by the address.

The memory controller 200 may control an overall operation of the memory system 50.

When power is applied to the memory system 50, the memory controller 200 may execute firmware (FW). In one embodiment, the memory controller 200 may execute firmware to control communication between the host 400 and the memory device 100. In one embodiment, the memory controller 200 may convert a logical block address of the host into a physical block address of the memory device.

The memory controller 200 may control the memory device 100 to perform the write operation, the read operation, the erase operation, or the like according to a request of the host 400. The memory controller 200 may provide a command, a physical block address, or data to the memory device 100 according to the write operation, the read operation, or the erase operation.

In one embodiment, the memory controller 200 may generate a command, an address, and data independently regardless of the request from the host 400 and transmit the command, the address, and the data to the memory device 100. For example, the memory controller 200 may provide the command, the address, and the data for performing the read operation and the write operations accompanying in performing wear leveling, read reclaim, garbage collection, and the like, to the memory device 100.

In one embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The buffer memory 300 may temporarily store data provided from the host 400 or temporarily store data read from the memory device 100. In one embodiment, the buffer memory 300 may be a volatile memory device. For example, the buffer memory 300 may be a dynamic random access memory (DRAM) or a static random access memory (SRAM). In one embodiment, the buffer memory 300 may be positioned outside the memory controller 200, or may be positioned inside the memory controller 200. In another embodiment, the buffer memory 300 may be positioned outside the memory system 50.

In one embodiment, the buffer memory 300 may store meta data. The meta data may be data including information used to operate the memory system 50. In one embodiment, the meta data may include map data indicating a corresponding relationship between a logical address of the host 400 and the physical address of the memory device 100.

In one embodiment, the buffer memory 300 may store information including a fail count read from the memory device 100. The information including the fail count may include the number of times a cache read operation on each memory block is failed.

In one embodiment, the information including the fail count may include the number of times a read retry operation is performed after the cache read operation on each memory block is failed. The information including the fail count may be updated when the cache read operation is failed.

The information including the fail count may further include read mode information. The read mode information may be read mode information for each memory block. The read mode information may include cache read allow information or cache read inhibit information. The cache read allow information may be information indicating that the cache read operation may be performed on a corresponding memory block. The cache read inhibit information may be information indicating that the cache read operation may not be performed on a corresponding memory block.

In one embodiment, when the fail count of a memory block is less than the reference count, the read mode information of a memory block may include the cache read allow information. In another embodiment, when the fail count of another memory block is equal to or greater than the reference count, the read mode information of the other memory block may include the cache read inhibit information.

In one embodiment, the memory controller 200 may include an operation controller 210 and an error corrector 220. The operation controller 210 may control the write, read, and erase operations on the memory device 100. In one embodiment, the operation controller 210 may read the data stored in the memory device 100 in response to a read request from the host 400. In one embodiment, the operation controller 210 may control the memory device 100 to perform a normal read operation or the cache read operation in response to the read request from the host 400.

The cache read operation may be an operation of sensing data stored in another page while outputting data stored in one page among a plurality of pages included in a selected memory block to the memory controller 200. In one embodiment, the cache read operation may be performed when a physical address of the one page and a physical address of the other page are consecutive sequential addresses. In one embodiment, the operation controller 210 may control the memory device 100 to perform the cache read operation when physical addresses of pages in which data corresponding to the read request of the host 400 are stored are consecutive addresses. In another embodiment, the operation controller 210 may control the memory device 100 to perform the cache read operation according to a preset condition regardless of the physical addresses of the pages in which the read requested data is stored.

The normal read operation may be an operation of outputting data stored in one page among the plurality of pages included in the memory device 100 to the memory controller 200 and sensing data stored in another page. In one embodiment, the operation controller 210 may control the memory device 100 to perform the normal read operation when the physical addresses of the pages in which the data corresponding to the read request of the host 400 are stored are not consecutive addresses.

In one embodiment, the operation controller 210 may provide a cache read command to the memory device 100 when the cache read operation is required. The operation controller 210 may receive the data read by the cache read operation from the memory device 100. The operation controller 210 may provide the data read by the cache read operation to the error corrector 220.

The error corrector 220 may perform an error correction operation of correcting an error of the data read by the cache read operation. When the number of error bits included in the data read by the cache read operation is less than the reference number of correctable error bits, the error correction operation may be passed. When the error correction operation is passed, the error corrector 220 may provide error corrected data to the operation controller 210, and the operation controller 210 may provide the error corrected data to the host 400.

However, when the number of error bits included in the data read by the cache read operation is greater than the reference number of correctable error bits, the error correction operation may be failed. The error corrector 220 may provide a signal to the operation controller 210 indicating that the error correction operation on the data read by the cache read operation is failed.

When the error correction operation on the data read by the cache read operation is failed, the operation controller 210 may control the memory device 100 to perform the read retry operation. The read retry operation may be an operation of reading the data stored in the memory device 100 using a read voltage different from a default read voltage used in the cache read operation. In one embodiment, the operation controller 210 may control the memory device 100 to perform the read retry operation using read retry voltages greater or less than a default voltage by an offset voltage. The operation controller 210 may provide the data read by the read retry operation to the error corrector 220. The error corrector 220 may provide the error corrected data to the operation controller 210 when the number of error bits included in the data read by the read retry operation is less than the reference number of error bits, and the operation controller 210 may provide the error corrected data to the host 400. That is, when the error correction for the data obtained by the cache read operation is failed, the cache read operation may be failed and the read retry operation may be performed.

In one embodiment, the operation controller 210 may count the number of times the error correction on the data read by the cache read operation is failed and the read retry operation is performed. When the error correction of the data read by the cache read operation is failed, the operation controller 210 may increase the fail count of the memory block on which the cache read operation is performed.

The operation controller 210 may update the read mode information of the memory block based on a result of comparing the fail count of the memory block and the reference count. In one embodiment, when the fail count of the memory block is equal to or greater than the reference count, the operation controller 210 may update the read mode information of the memory block to the cache read inhibit information.

The operation controller 210 may control the memory device 100 to perform the normal read operation or the cache read operation based on the read mode information of the memory block in which the data corresponding to the read request from the host 400 is stored. In one embodiment, when the read mode information of the memory block in which the data corresponding to the read request of the host 400 is stored includes the cache read inhibit information, the operation controller 210 may control the memory device 100 to read the data through the normal read operation. In another embodiment, when the read mode information of the memory block in which the data corresponding to the read request of the host 400 is stored includes the cache allow information, the operation controller 210 may control the memory device 100 to read the data through the cache read operation.

The host 400 may communicate with the memory system 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
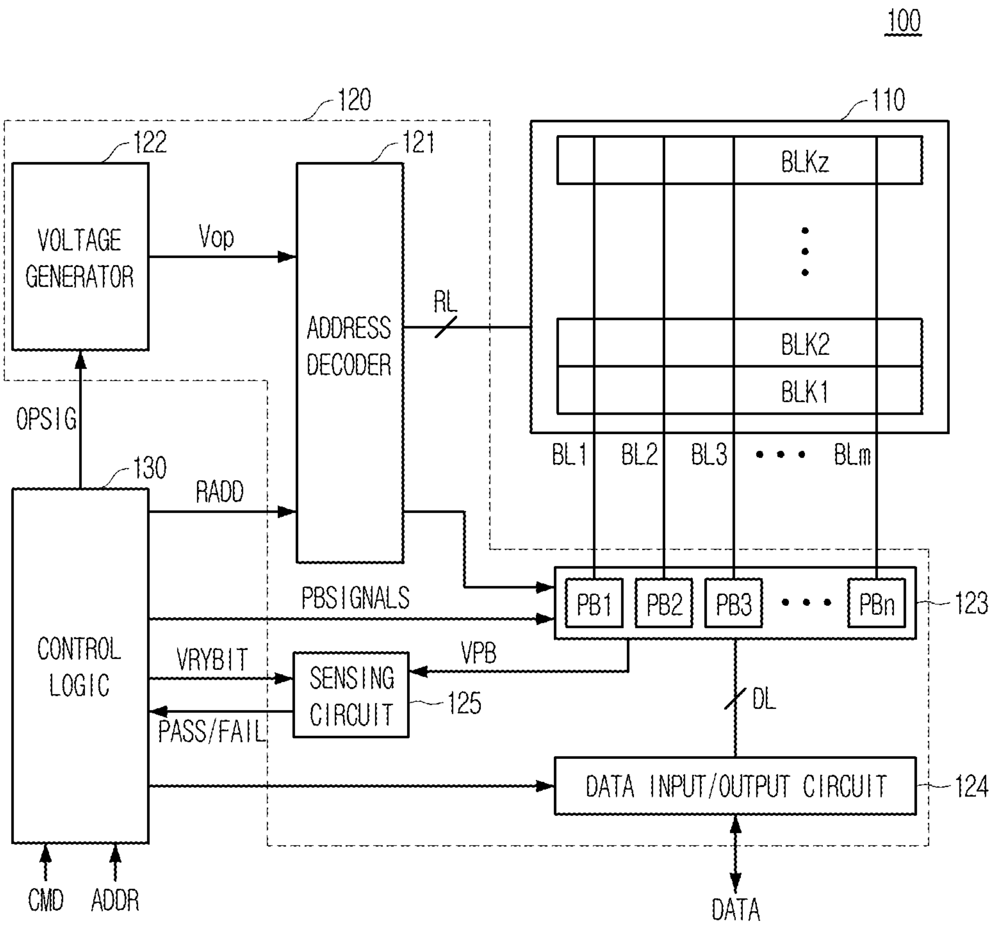
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. In one embodiment, the plurality of memory cells may be nonvolatile memory cells. Memory cells connected to the same word line among the plurality of memory cells may be defined as one page. That is, the memory cell array 110 may be configured as a plurality of pages. In one embodiment, the page may be a unit for storing data or reading stored data. The memory block may be a unit for erasing data. In one embodiment, each of the plurality of memory blocks BLK1 to BLKz included in the memory cell array 110 may include a plurality of dummy memory cells. At least one of the dummy memory cells may be connected in series between a drain select transistor and the memory cells and between a source select transistor and the memory cells.

Each of the memory cells of the memory device 100 may be configured as a single level cell (SLC) that stores one bit of data, a multi-level cell (MLC) that stores two bits of data, a triple level cell (TLC) that stores three bits of data, a quad level cell (QLC) capable of storing four bits of data, or memory cells that store five or more bits of data.

The peripheral circuit 120 may drive the memory cell array 110. For example, the peripheral circuit 120 may drive the memory cell array 110 to perform the program operation, the read operation, and the erase operation under the control of the control logic 130. As another example, the peripheral circuit 120 may apply various operation voltages to the row lines RL and the bit lines BL1 to BLm or discharge the applied voltages according to the control of the control logic 130.

The peripheral circuit 120 may include the address decoder 121, a voltage generator 122, the page buffer group 123, a data input/output circuit 124, and a sensing circuit 125.

The address decoder 121 may be connected to the memory cell array 110 through the row lines RL. The row lines RL may include drain select lines, word lines, source select lines, and a source line. In one embodiment, the word lines may include normal word lines and dummy word lines. In one embodiment, the row lines RL may further include a pipe select line.

The address decoder 121 may be configured to operate in response to the control of the control logic 130. The address decoder 121 may receive an address ADDR from the control logic 130.

The address decoder 121 may be configured to decode a block address of the received address ADDR. The address decoder 121 may select at least one memory block among the memory blocks BLK1 to BLKz according to the decoded block address. The address decoder 121 may be configured to decode a row address of the received address ADDR. The address decoder 121 may select at least one word line of the selected memory block by applying voltages provided from the voltage generator 122 to at least one word line WL according to the decoded row address.

During the program operation, the address decoder 121 may apply the program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

The erase operation of the memory device 100 may be performed in a memory block unit. The address ADDR input to the memory device 100 during the erase operation may include a block address. The address decoder 121 may decode the block address and select one memory block according to the decoded block address. During the erase operation, the address decoder 121 may apply a ground voltage to the word lines connected to the selected memory block.

The address decoder 121 may be configured to decode a column address of the transmitted address ADDR. The decoded column address may be transmitted to the page buffer group 123. As an example, the address decoder 121 may include a component such as a row decoder, a column decoder, and an address buffer.

The voltage generator 122 may be configured to generate a plurality of operation voltages Vop by using an external power voltage supplied to the memory device 100. The voltage generator 122 may operate in response to the control of the control logic 130.

As an example, the voltage generator 122 may generate an internal power voltage by regulating the external power voltage. The internal power voltage generated by the voltage generator 122 is used as an operation voltage of the memory device 100.

In one embodiment, the voltage generator 122 may generate the various operation voltages Vop used for the program, read, and erase operations in response to an operation signal OPSIG. The voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop.

The plurality of generated operation voltages Vop may be supplied to the memory cell array 110 by the address decoder 121.

The page buffer group 123 may include first to m-th page buffers PB1 to PBm. The first to m-th page buffers PB1 to PBm may be connected to the memory cell array 110 through first to m-th bit lines BL1 to BLm, respectively. The first to m-th page buffers PB1 to PBm may operate in response to the control of the control logic 130.

The first to m-th page buffers PB1 to PBm may communicate data DATA with the data input/output circuit 124. At a time of programming, the first to m-th page buffers PB1 to PBm may receive the data DATA through the data input/output circuit 124 and data lines DL.

During the program operation, the first to m-th page buffers PB1 to PBm may transmit the data DATA received through the data input/output circuit 124 to the selected memory cells through the bit lines BL1 to BLm. The memory cells of the selected page may be programmed according to the transmitted data DATA. A memory cell connected to a bit line to which a program allowable voltage (for example, a ground voltage) is applied may have an increased threshold voltage. A threshold voltage of a memory cell connected to a bit line to which a program inhibit voltage (for example, a power voltage) is applied may be maintained. During the program verify operation, the first to m-th page buffers PB1 to PBm may read the data DATA stored in the memory cells from the selected memory cells through the bit lines BL1 to BLm.

During the read operation, the page buffer group 123 may read the data DATA from the memory cells of the selected page through the bit lines BL and store the read data DATA in the first to m-th page buffers PB1 to PBm.

During the erase operation, the page buffer group 123 may float the bit lines BL. In one embodiment, the page buffer group 123 may include a column selection circuit.

In one embodiment, while data stored in some of the page buffers among the plurality of page buffers included in the page buffer group 123 is programmed in the memory cell array 110, other page buffers may receive new data from the memory controller 200 and store the new data.

The data input/output circuit 124 may be connected to the first to m-th page buffers PB1 to PBm through the data lines DL. The data input/output circuit 124 may operate in response to the control of the control logic 130.

The data input/output circuit 124 may include a plurality of input/output buffers (not shown) that receive input data DATA. During the program operation, the data input/output circuit 124 may receive the data DATA to be stored from an external controller (not shown). During the read operation, the data input/output circuit 124 may output the data DATA transmitted from the first to m-th page buffers PB1 to PBm included in the page buffer group 123 to the external controller.

During the read operation or the verify operation, the sensing circuit 125 may generate a reference current in response to a signal of an allowable bit VRYBIT generated by the control logic 130 and may compare a sensing voltage VPB received from the page buffer group 123 with a reference voltage generated by the reference current to output a pass signal or a fail signal to the control logic 130. For example, the sensing circuit 125 may output the pass signal to the control logic 130 when a magnitude of the sensing voltage VPB is greater than the reference voltage. As another example, the sensing circuit 125 may output the fail signal to the control logic 130 when the magnitude of the sensing voltage VPB is less than the reference voltage.

The control logic 130 may be connected to the address decoder 121, the voltage generator 122, the page buffer group 123, the data input/output circuit 124, and the sensing circuit 125. The control logic 130 may be configured to control all operations of the memory device 100. The control logic 130 may operate in response to a command CMD transmitted from an external device.

The control logic 130 may generate various signals in response to the command CMD and the address ADDR to control the peripheral circuit 120. For example, the control logic 130 may generate the operation signal OPSIG, the address ADDR, a page buffer control signal PBSIGNALS, and the allowable bit VRYBIT in response to the command CMD and the address ADDR. The control logic 130 may output the operation signal OPSIG to the voltage generator 122, output the address ADDR to the address decoder 121, output the page buffer control signal PBSIGNALS to the page buffer group 123, and output the allowable bit VRYBIT to the sensing circuit 125. In addition, the control logic 130 may determine whether the verify operation is passed or failed in response to the pass or fail signal PASS/FAIL output by the sensing circuit 125.

Figure 3:
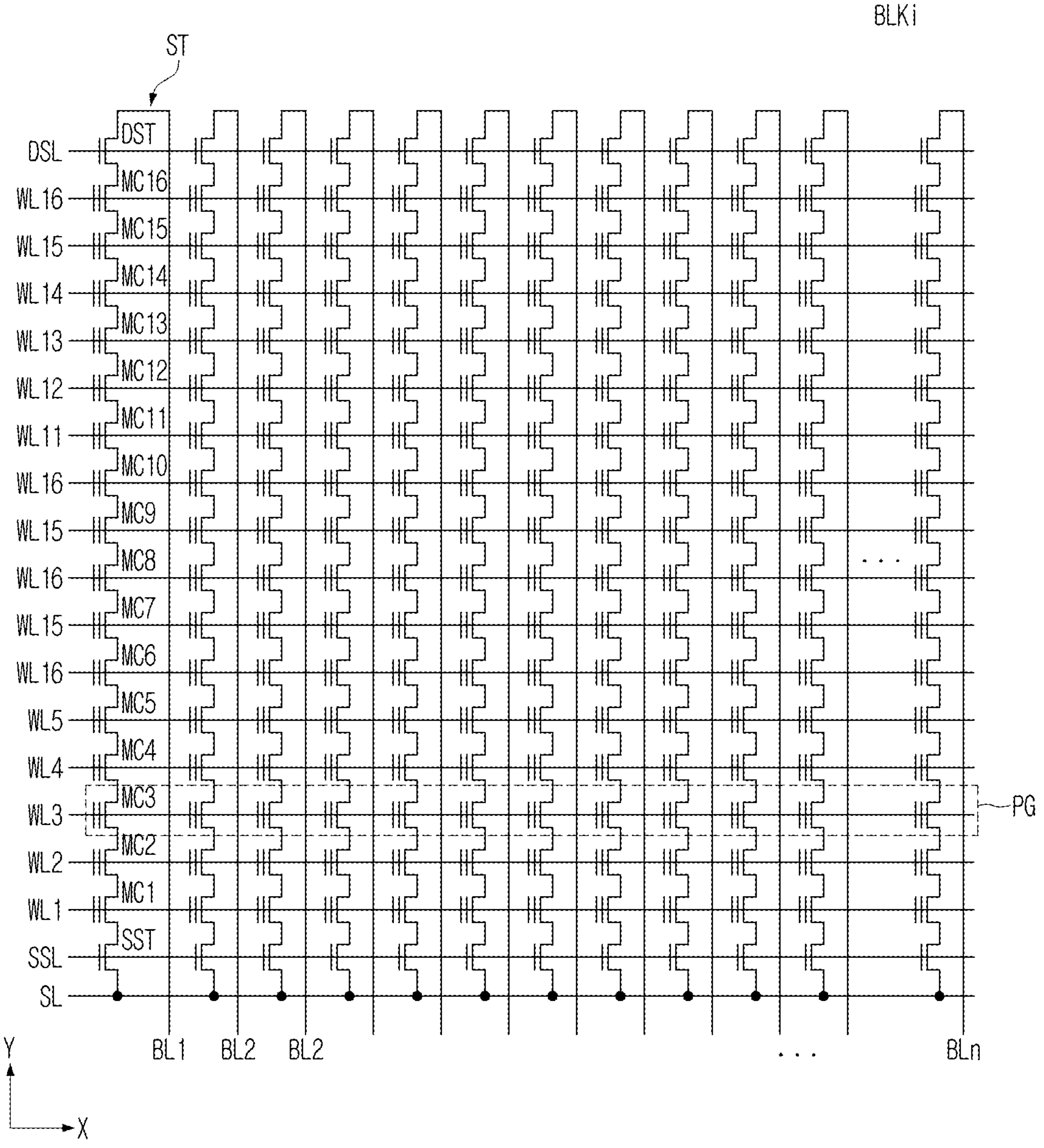
FIG. 3 is a diagram illustrating a structure of a memory block among a plurality of memory blocks BLK1 to BLKz of FIG. 2 according to an embodiment of the present disclosure.

FIG. 3 is a diagram illustrating a structure of a memory block among the plurality of memory blocks BLK1 to BLKz of FIG. 2 according to an embodiment of the present disclosure.

The memory block BLKi may be a memory block BLKi among the memory blocks BLK1 to BLKz shown in FIG. 2.

Referring to FIG. 3, a plurality of word lines arranged in parallel with each other between a first select line and a second select line may be connected. Here, the first select line may be a source select line SSL, and the second select line may be a drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured identically to each other, a string ST connected to the first bit line BL1 is specifically described as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and a number of memory cells MC1 to MC16 may also be included which is more than the number shown in the drawing.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a physical page PG. Therefore, the memory block BLKi may include the physical pages PG of the number of the plurality of word lines WL1 to WL16.

One memory cell may store one bit of data. This is commonly referred to as the SLC. In this case, one physical page PG may store one logical page (LPG) data. One logical page (LPG) data may include a number of data bits as the number of cells included in one physical page PG.

One memory cell may store two or more bits of data. In this case, one physical page PG may store two or more logical page (LPG) data.

Figure 4:
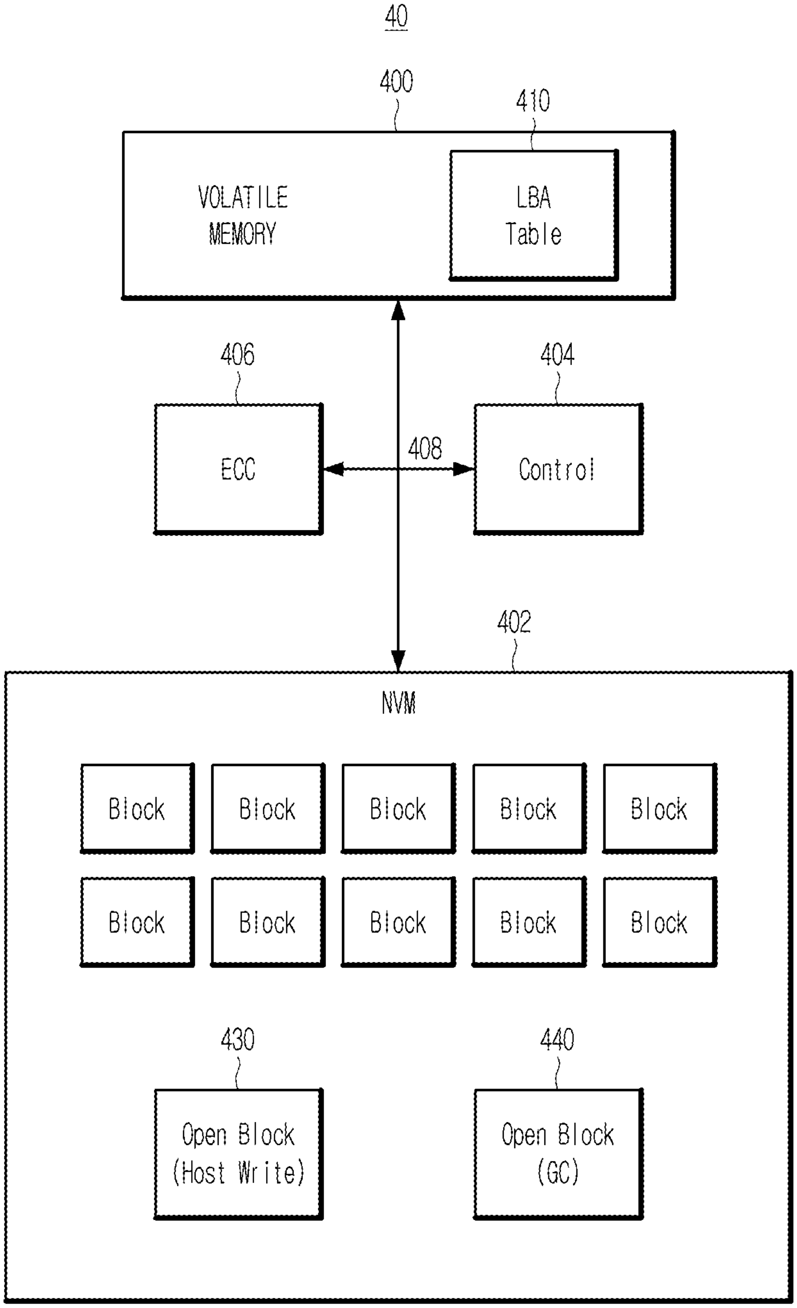
FIG. 4 is a diagram of an exemplary memory system in accordance with an embodiment of the present invention.

Referring to FIG. 4, a general example of a memory system 40 is schematically illustrated. The memory system 40 may include a volatile memory 400 (e.g., a DRAM), a non-volatile memory (NVM) 402 (e.g., NAND), a control component or control logic 404, such as described herein, an error correcting code (ECC) module 406, such as described herein, and a bus 408 through which these components of the memory system 40 communicate. The volatile memory 400 may include a logical bit address LBA table 410 for mapping physical-to-logical addresses of bits. The NVM 402 may include a plurality of memory blocks (and/or a plurality of super memory blocks), as well as an open block for host writes 430 and an open block for garbage collection (GC) 440. The memory system 40 shows a general memory system. Additional/alternative components that may be utilized with memory systems to effectuate the present invention will be understood to those of skill in the art in light of this disclosure.

As referred to herein, terms such as "NAND" or "NVM" may refer to non-volatile memories such as flash memories which may implement error correcting code processes. Further, "DRAM" may refer to volatile memories which may include components such as controllers and ECC modules.

In embodiments of the present invention, the memory system 10 may include multiple decoders that are configured to decode low-density parity-check (LDPC) codes.

There are many iterative decoding algorithms for LDPC codes, such as bit-flipping (BF) decoding algorithms, belief-propagation (BP) decoding algorithms, sum-product (SP) decoding algorithms, min-sum (MS) decoding algorithms, and Min-Max decoding algorithms.

Figures 5, 6:
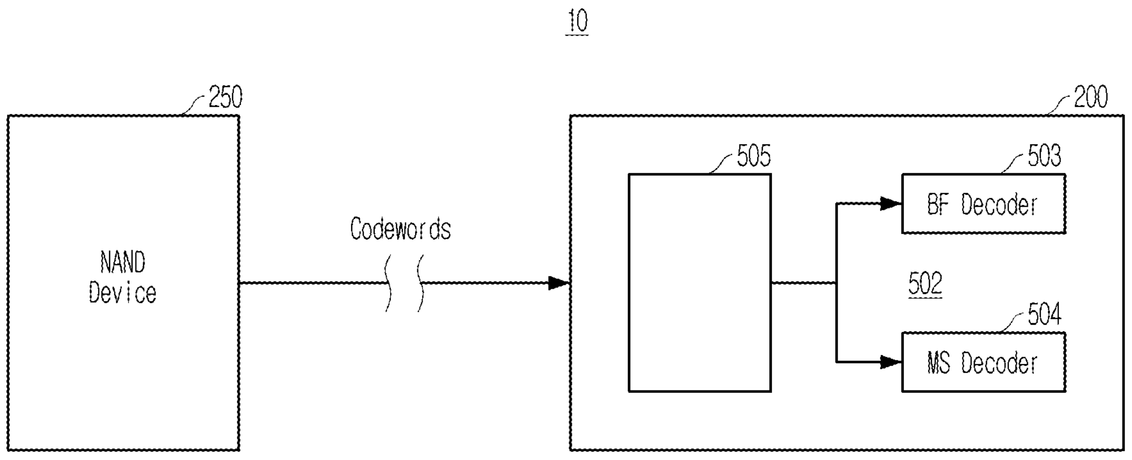
FIG. 5 is a diagram of an exemplary memory system including different decoders in accordance with an embodiment of the present invention.
FIG. 6 is a depiction of a matrix of a LDPC code.

In accordance with embodiments of the present invention, and as shown in FIG. 5, the memory system 10 may include the memory device 250, which may be a NAND device, and the memory controller 200. The memory system 10 may include decoding assembly 502, which includes a bit-flipping (BF) decoder 503 to execute a BF decoding algorithm to decode codewords read from the memory device 200 and a min-sum (MS) decoder 504 to execute an MS decoding algorithm. The BF decoder 503 and the MS decoder 504 may be embodied in the ECC component 130 (shown in FIG. 2) in the memory controller 100 or in any other suitable location. The codewords received from the memory device 200 by the memory controller 100 may be temporarily stored in a buffer or storage 505 of the memory controller 100 before being passed to one or the other of the decoders. In one embodiment of the present invention, the MS decoder 504 is a hybrid precision MS decoder (noted above and described in more detail below).

The memory system 10 may include other components (not shown) such as a checksum module, which computes checksums of codewords retrieved from the memory device 200 before decoding. The checksum module may be embodied within the memory controller 100 before the storage 505. The memory system 10 may further include cyclic redundancy check (CRC) modules disposed downstream of the BF decoder 503 and MS decoder 504, respectively. The CRC modules may be embodied within the memory controller 100.

With respect to the two decoding algorithms, MS decoding, performed by its associated decoder 504, is more powerful due to its higher complexity required to process soft input information. However, the less powerful BF decoding, performed by its associated decoder 503, is useful when the number of errors is low.

MS decoding can be used as part of an iterative LDPC decoding. LDPC codes are linear block codes defined by a sparse parity-check matrix H, which consists of zeros and ones. The term "sparse matrix" is used herein to refer to a matrix in which a number of non-zero values in each column and each row is much less than its dimension. The term "column weight" is used herein to refer to the number of non-zero values in a specific column of the parity-check matrix H. The term "row weight" is used herein to refer to number of non-zero values in a specific row of the parity-check matrix H. In general, if column weights of all of the columns in a parity-check matrix corresponding to an LDPC code are similar, the code is referred to as a "regular" LDPC code. On the other hand, an LDPC code is called "irregular" if at least one of the column weights is different from other column weights. Usually, irregular LDPC codes provide better error correction capability than regular LDPC codes.

LDPC codes are usually represented by bipartite graphs. One set of nodes, the variable or bit nodes correspond to elements of the codeword and the other set of nodes, e.g., check nodes, correspond to the set of parity-check constraints satisfied by the codeword. Typically, the edge connections are chosen at random. The error correction capability of an LDPC code is improved if cycles of short length are avoided in the graph. In a (r,c) regular code, each of the n variable nodes (V1, V2, . . . , Vn) has connections to r check nodes and each of the m check nodes (C1, C2, . . . , Cm) has connections to c bit nodes. In an irregular LDPC code, the check node degree is not uniform. Similarly, the variable node degree is not uniform. In QC-LDPC codes, the parity-check matrix H is structured into blocks of p×p matrices such that a bit in a block participates in only one check equation in the block, and each check equation in the block involves only one bit from the block. In QC-LDPC codes, a cyclic shift of a codeword by p results in another codeword. Here p is the size of square matrix which is either a zero matrix or a circulant matrix. This is a generalization of a cyclic code in which a cyclic shift of a codeword by 1 results in another codeword. The block of p×p matrix can be a zero matrix or cyclically shifted identity matrix of size p×p.

Figure 7A:
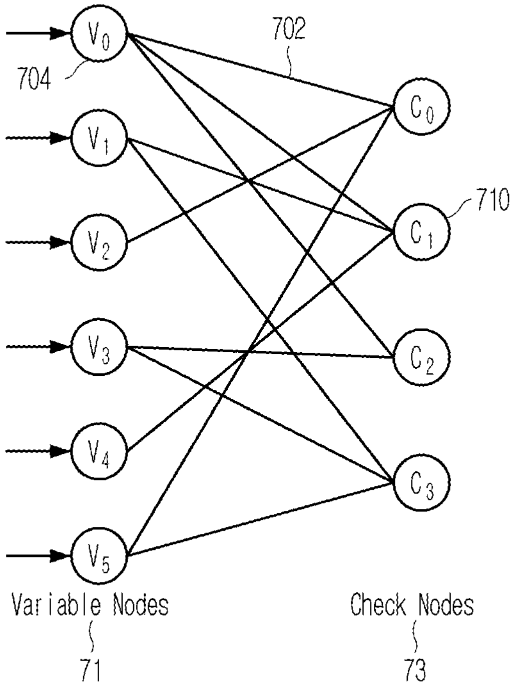
FIGS. 7A and 7B illustrate a Tanner graph representation of the LDPC code and user bits, check nodes and parity bits.

FIG. 6 illustrates an example parity-check matrix H 600, and FIG. 7A illustrates an example bipartite graph corresponding to the parity-check matrix 600.

Figure 7B:
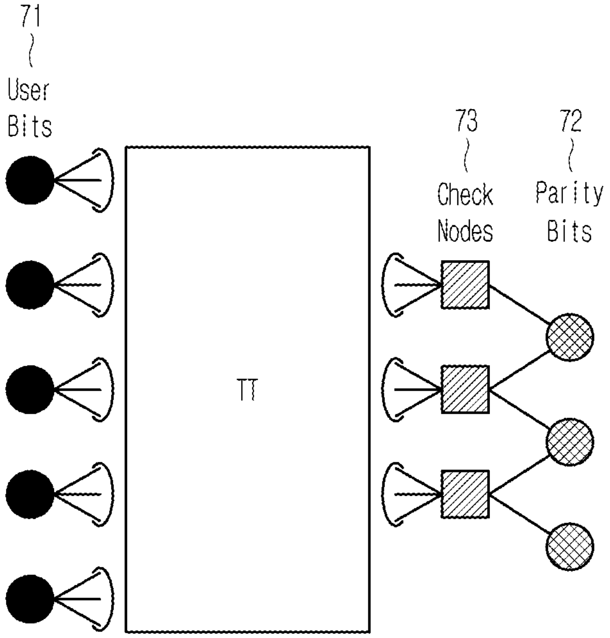

As shown in FIG. 6, the illustrative parity-check matrix 600 has six column vectors and four row vectors. Network 702 shown in FIG. 7A shows the network corresponding to the parity-check matrix 600 and represent a bipartite graph. Various types of bipartite graphs are possible, including, for example, a Tanner graph. A Tanner graph representation of an LDPC code, with user bits 71, parity bits 72 and check nodes 73, is shown in FIG. 7B.

In general, the variable nodes in network 702 correspond to the column vectors in the parity-check matrix 600. The check nodes in network 702 correspond to the row vectors of the parity-check matrix 600. The interconnections between the nodes are determined by the values of the parity-check matrix 200. Specifically, a "1" indicates the corresponding check node and variable nodes have a connection. A "0" indicates there is no connection. For example, the "1" in the leftmost column vector and the second row vector from the top in the parity-check matrix 600 corresponds to the connection between the variable node 704 and the check node 710.

A message passing algorithm may be used to decode LDPC codes. Several variations of the message passing algorithm exist in the art, such as min-sum (MS) algorithm, sum-product algorithm (SPA) or the like. Message passing uses a network of variable nodes and check nodes, as shown in FIG. 7A.

A hard decision message passing algorithm may be performed. In a first step, each of the variable nodes sends a message to one or more check nodes that are connected to it. In this case, the message is a value that each of the variable nodes believes to be its correct value.

In the second step, each of the check nodes calculates a response to send to the variable nodes that are connected to it using the information that it previously received from the variable nodes. This step can be referred as the check node update (CNU). The response message corresponds to a value that the check node believes that the variable node should have based on the information received from the other variable nodes connected to that check node. This response is calculated using the parity-check equations which force the values of all the variable nodes that are connected to a particular check node to sum up to zero (modulo 2).

At this point, if all the equations at all the check nodes are satisfied, the decoding algorithm declares that a correct codeword is found and it terminates. If a correct codeword is not found, the iterations continue with another update from the variable nodes using the messages that they received from the check nodes to decide if the bit at their position should be a zero or a one by a majority rule. The variable nodes then send this hard decision message to the check nodes that are connected to them. The iterations continue until a correct codeword is found, a certain number of iterations are performed depending on the syndrome of the codeword (e.g., of the decoded codeword), or a maximum number of iterations are performed without finding a correct codeword.

At each iteration of the decoding, the systematic (user) bits 71 and the low-degree parity bits 72 (such as shown in FIG. 7B), may be decoded alternatively. The user bits 71 may be decoded one-by-one using for example MS operations. The low-degree parity bits may be jointly decoded using the results of the user bits 71. The results from the joint decoding may be used for the next iteration.

Figure 7C:
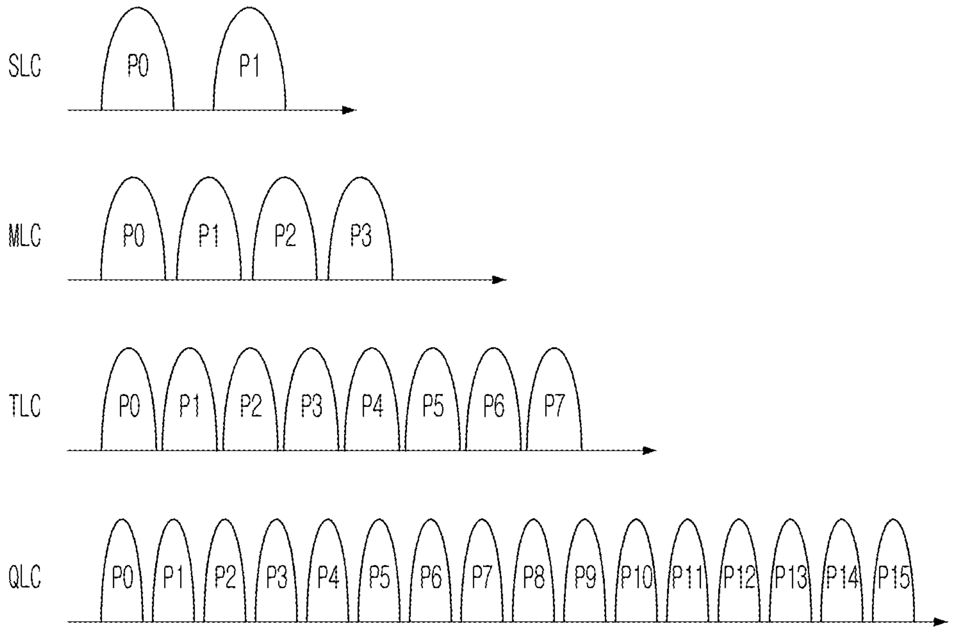
FIG. 7C is a diagram illustrating distributions of states or program voltage (PV) levels for different types of cells of a memory device.

FIG. 7C is a diagram illustrating distributions of states or program voltage (PV) levels for different types of cells of a memory device.

Referring to FIG. 7C, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as SSD.

As an example of setting threshold voltages, consider the TLC in which one memory cell stores three bits of data. The initial state of the TLC may be the state in which a program operation has not been performed and in which the threshold voltage distributions of the memory cells are all in the erase state E. Following programming, each of the memory cells may have a threshold voltage corresponding to one of a plurality of program states. Each of the memory cells on which the program operation has been performed may have a threshold voltage corresponding to one of the erase state E and the first to seventh program states PV1 to PV7, as shown in FIG. 7C for the TLC example. The threshold voltage of each memory cell in the initial state may be increased to the threshold voltage corresponding to one of the erase state E and the first to seventh program states PV1 to PV7 through the program operation.

The program operation may include a plurality of program loops PL1 to PLn to each of selected memory cells coupled to a selected word line so that the memory cells have threshold voltages corresponding to the plurality of program states. Each of the plurality of program loops PL1 to PLn may include a program voltage apply operation (PGM Step) and a verify operation (Verify Step).

The program voltage apply operation (PGM Step) may be an operation of applying the program voltage to the selected word line coupled to the selected memory cells. In the program voltage apply operation (PGM Step), the threshold voltages of the selected memory cells may be increased by the program voltage.

The verify operation (Verify Step) may be an operation of applying a verify voltage to the selected word line coupled to the selected memory cells. The verify operation (Verify Step) may be an operation of identifying the threshold voltages of the memory cells increased by the program voltage apply operation. In detail, the verify operation (Verify Step) may be an operation of obtaining sensed data through a bit line coupled to memory cells when the verify voltage is applied to the word line coupled to the memory cells. During the verify operation (Verify Step), when the threshold voltage of each of the memory cells is greater than the verify voltage, data corresponding to an off-cell may be sensed. During the verify operation (Verify Step), when the threshold voltage of each of the memory cells is less than the verify voltage, data corresponding to an on-cell may be sensed.

NAND Flash Organization

In an SSD, during the program operation of a multi-level (e.g. N-Level) NAND, cells are typically programmed into one of $2^N$ possible threshold voltages to store N bits of information into the cell, as illustrated above for the TLC programming of threshold voltages.

In a quad-level cell (QLC) NAND device, the program operation is performed by having established threshold voltages (Vt) of each cell into one of sixteen possible threshold voltage levels (PV0, PV1, . . . , PV15) based on four bits of data that is written into the QLC cell. To read this data, a series of read operations are performed at predetermined read levels (e.g., a subset of $2^N-1$ read levels).

The threshold voltages of the memory cells can be established by applying a series of program pulses with increasing magnitude to the control gates of the cells. Each pulse is followed by a series of program-verify steps, such as the verify operation (Verify Step) described above, to compare the threshold voltages retained by the cells after the program pulse with specific program verify levels.

A program pulse followed by a number of program-verify steps is referred to hereinafter as a pulse-verify loop.

To reduce the number of program-verify pulses needed in a pulse-verify loop, a technique known as predictive CSC (Current Sense Comparator) can be used. In such a case, the number of failing bits from previously obtained program-verify information for a specific program level are compared with configurable CSC criteria under the given pulse, where a prediction is made that, if the number of failing bits is less than the criteria, the given pulse is strong enough to pass remaining cells for the specific program level, meaning that the memory cells have voltage thresholds established at the threshold voltage levels (PV0, PV1, . . . , PV15). In one embodiment, one configurable criterion can be an allowed fail bit criteria value that a user can configure by updating a "Trim or Register." In another embodiment, one or more configurable criteria can be generally decided based on the error correction code (ECC) capability of the memory, and is often about 10 to 100 times lower than the ECC limit.

Accordingly, the memory controller logic stops issuing program-verify pulses for any specific program level found to pass, and inhibits those memory cells in all future program pulses, meaning that the cells under test are no longer tested with a program verify pulse at specific program level found to pass. In other words, inhibited memory cells are inhibited from further program-pulses and program-verifies as these memory cells have already reached their established threshold voltages. One value of the predictive CSC approach is the saving of one last verify pulse that occurs for every program pulse level, which can provide a significant program performance improvement in the time to program (tPROG) the memory cells.

During the CSC operation, the page-buffer current can be compared with a reference current using a current sense comparator circuit to decide if the number of failing bits passes or fails against a pre-defined CSC criteria for a particular program-verify level. For example, an algorithm (in a memory controller) and the circuit in the CSC comparator are designed in such a way that the measured page-buffer current is directly proportional to the number of fail cells for the specific program pulse level. That is, in the case of no fail cells there would be no page-buffer current. Additionally, the reference current is set to be directly proportional to the number of fails allowed by the predictive CSC at the same program pulse level. As to the power consumption, according to the CSC scheme, a greater number of fail cells (cells that do not have the proper thresholds for PV0, PV1, . . . , PV15) causes a higher page-buffer current and more power consumption.

There are applications where, if a program operation is performed with the higher gate-steps from one program pulse to the next, the number of cells that the next pulse can program with the higher gate-voltage could be more than what the CSC circuit can support.

For example, a CSC circuit may only be able to detect up to 64 fail cells per 1 KB while a programming pulse with higher gate-steps may be capable of passing up to 96 or 127 cells per 1 KB depending on the magnitude of the gate-voltage applied with the programming pulse.

In such a case, the CSC algorithm limits the program-verify cycle and costs tPROG time by issuing an additional verify step for the specific program level which otherwise could have been avoided.

One solution to this issue could be to update the CSC circuit to have an extended fail detection capability. However, that solution potentially means an increase in the physical size of the CSC circuit, which causes more power consumption and causes the overall die size to increase.

Innovative Methods for Current Sense Comparisons

During the program operation of Multi-Level NAND, cells are typically programmed into one of $2^N$ possible threshold voltages to store N bits of information. For example, in a quad-level cell (QLC) NAND device, programming is achieved by placing the threshold voltage (Vt) of each cell into one of sixteen possible threshold voltage levels (PV0, PV1, . . . , PV15) based on four bits of data that is written into the cell.

The threshold voltage can be achieved by applying a series of program pulses with increasing magnitude to the control gate of targeted NAND cells, with each pulse being followed by a series of verify steps (program-verify pulses) to compare the threshold voltage of the targeted NAND cells against specific program verify levels.

This present disclosure provides a method that can (1) improve the power consumption for example by up to 50% during the CSC operation (described above), (2) increase the CSC fail detection capability, for example, double the CSC fail detection capability to effectively check for a greater number of fail cells without the need of increasing the physical size of the CSC circuit, and (3) allow a reduction in the number of CSC circuits required by 50% for an improvement in the die-size.

According to one embodiment of this inventive scheme, the CSC operation is performed on a segment of the memory cells instead of on all of the memory cells. For example, the CSC operation can be performed on 8 KB (either odd or even-configurable) cells, instead of on all 16 KB cells in a die.

According to one embodiment of this inventive scheme, between a first group of the memory cells segmented from a second group of the memory cells, one of the first or second groups is masked during the CSC data-setup. That is one of the first of second groups is marked (designated) as "passed" with the passed group no longer contributing to Page-Buffer Current during the CSC operation. Afterwards, the CSC operations can be performed sequentially on both the first and second groups, with the results from each group sent to the CSC circuit for the fail detection via current comparison.

According to one embodiment of this inventive scheme, between an odd group of 50% odd cells and an even group of 50% even cells, one of the odd and even groups are masked during the CSC data-setup.

Afterwards, the CSC operations can be performed sequentially on both the odd and even groups, with the results from each group sent to the CSC circuit for the fail detection via current comparison. In that case, a summation of the number of fail bits determined for both the odd group and the even group would obtain a total number of fail bits.

As a result, both the csc-page-buffer current, and the csc-reference-current (to be discussed in detail below) can be reduced for example by up to 50% when the memory cells being programmed and verified are segmented into odd and even groups for the CSC operations.

Because the CSC operation can be repeated for every 1 KB cells at a time, the CSC operation according to the inventive scheme can effectively be performed only on 0.5 KB odd or even cells per chunk and still can detect up to 64 fail cells.

As the programmed data are randomly distributed across all PV levels, the inventors have discovered that it is a fair assumption that, if 0.5 KB cells have less than 64 fail cells, then as an estimate 1 KB cells would have roughly less than 128 fail cells. This segmented approach effectively increases (doubles) the CSC fail detection capability.

For the cases where precision is crucial in fail detection, the inventive scheme can be used as described above to sequentially perform the CSC operation on the odd and even groups to double the CSC fail detection capability without compromising granularity.

As to the power efficiency, the inventive scheme in one embodiment can be used on only one group between the odd and even groups (or more generally on only one group between first and second groups segmented from each other) for the cases where precision is not critical in detecting fail cells. For example, the inventive scheme in one embodiment can be used with only one (odd or even) group, and the fail bit measured then doubled for an estimate of total fail bits As to the performance, the CSC operation scheme in one embodiment can be used for the program operations with higher program-voltage and/or program-gate-steps for the programming pulses. For example, according to the inventive scheme, an SLC two program/two program-verify (2P-2V) operation may be completed in a two program/one program-verify (2P-1V) operation. In another embodiment, a TLC last level program that typically takes multiple program pulses may now be completed with one less program pulse.

Figure 8:
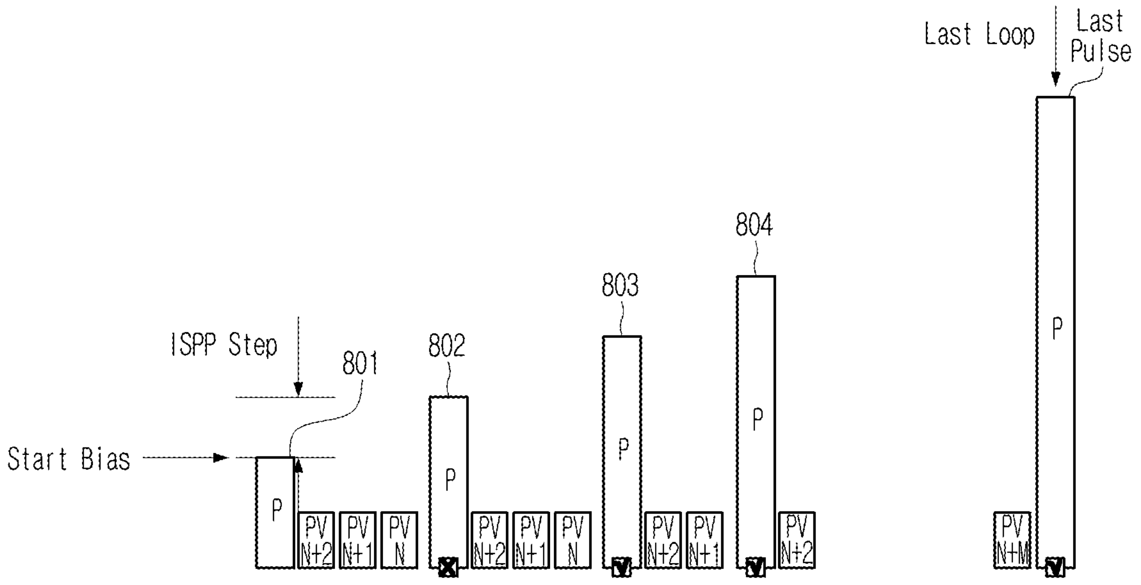
FIG. 8 is a schematic representation of a program operation in accordance with one embodiment of the present invention.

FIG. 8 is a schematic representation of a program operation in accordance with one embodiment where the "P" represents a program pulse and the "V" represents a program-verify level. The box under the program pulse represents the CSC operation where the one marked with the "x" sign is a failed CSC operation indicating that a proper threshold voltage was not established and the one marked with "√" sign is a passed CSC operation indicating that a proper threshold voltage was established.

As shown, the program operation starts with the program pulse 801 (i.e., a start bias) with the start-bias followed by a series of pulses at the program-verify levels PV_N, PV_N+1, and PV_N+2.

There is no CSC operation performed after the first program pulse 801 as there is no program-verify pass/fail information available at that point of the operation.

After the 2nd program pulse 802 biased with "start-bias+ISPP-step" (where ISPP=Incremental Step Pulse Programming, also known as program-gate-steps), a CSC operation is performed to determine PV_N pass/fail information.

During the specific CSC operation (where a current measured is representative of the number of failing cells that do not have a proper threshold voltage), a number of PV_N fail cells is compared with a configurable criteria (for example set by a trim voltage in the CSC).

If the number of PV_N fail cells are less than the criteria, a prediction is made that the program pulse applied before the program-verify pulses is sufficient enough to pass the majority of cells at the PV_N level. In that case, the algorithm of the controller updates the previous PV_N failing cells to identify those cells as PV_N passing cells and marks or designates the PV_N passing cell as inhibit for remainder of the program-pulses and program-verifies. For example, the algorithm can predict the current pulse to establish the target threshold voltage for those PV_N cells, and the PV_N passing cells can be marked or designated as inhibited cells. The marked inhibited cells do not participate in programming going forward in that those inhibited cells are inhibited from further program-pulses and program-verifies as those cell have already reached their established threshold voltage.

If the number of PV_N fail cells is more than a predefined criteria, then the CSC operation is considered a "fail" to pass the majority of the PV_N fail cells, and a program-verify pulse at the same PV_N program-verify level is applied again after the next program pulse at a higher bias is applied.

FIG. 8 shows that the 2nd program pulse 802 fails the CSC operation for the PV_N program-verify level. Hence, the PV_N program-verify level is still applied after the 2nd program pulse.

However, the result of the 3rd program pulse 803 passes the CSC operation for the PV_N program-verify level, and the PV_N program-verify level is no longer applied from that point because the voltage threshold for the PV_N state has been established.

After the 4th program pulse 804, the result of the 4th program pulse passes the CSC operation for the PV_N+1 program-verify level, and a pulse at the PV_N+1 program-verify level is no longer applied from that point because the voltage threshold for the PVN+1 state has been established.

As such, the CSC scheme continues to save the tPROG by eliminating applications of the last program-verify levels for each program level.

Figure 9:
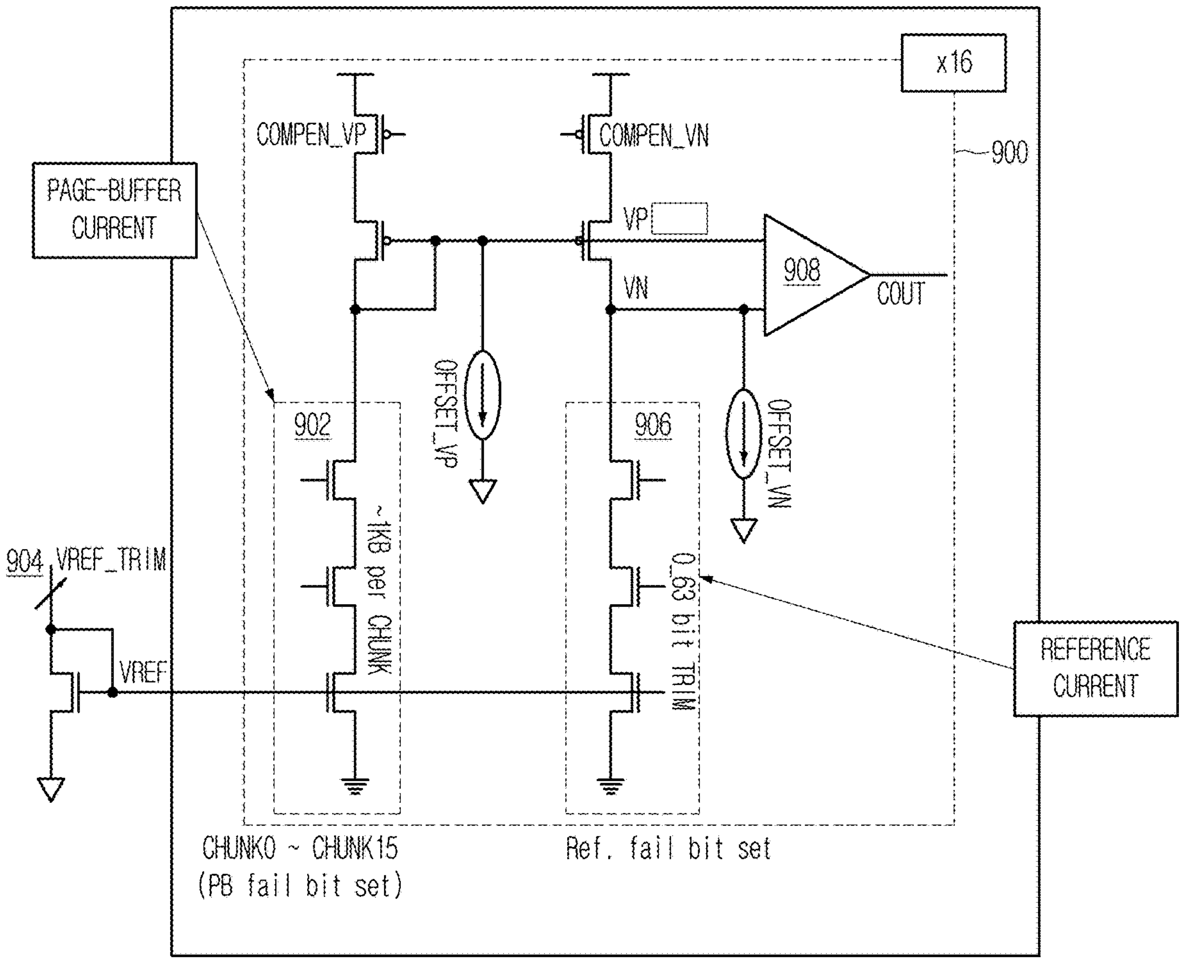
FIG. 9 is a schematic representation of the current sense comparator (CSC) circuit in accordance with one embodiment of the present invention.

FIG. 9 is a schematic representation of a CSC circuit 900 in accordance with one embodiment of the present invention where the csc-page-buffer current from page buffer 123 of FIG. 2 is compared with the csc-reference current from sensing circuit 125 of FIG. 2. While described in more detail below, each CSC circuit 900 includes a page-buffer current sensor 902 (coupled to the page buffer 123 of FIG. 2), a page reference current sensor 906 (coupled to sensing circuit 125 of FIG. 2), and an operational amplifier 908. A variable voltage supply 904 provides a configurable reference bit count as a trim voltage to page reference current sensor 906. In FIG. 9, VP and VN are sense nodes at which the page-buffer and page-reference current are compared. The COMPEN_* transistors are used to precharge the VP/VN nodes prior to starting the CSC operation. VREF is a configurable setting used for adjusting the fail bit sense current.

One CSC circuit 900 is allocated for each chunk of 1 KB cells, and sixteen (16) CSC circuits 900 are provided respectively for sixteen (16) chunks of the 1 KB cells (totally 16 KB cells).

During the CSC data-setup, the program-verify fail cells information of a specific program-verify level is placed on a page-buffer node that is connected with the page-buffer current sensor 902 of the CSC circuit 900. Similarly, during the CSC reference-setup, a configurable reference bit count (from 0 to 63) (set through the trim of a variable voltage supply 904) is reflected (applied to one gate) of the page reference current sensor 906.

The operational amplifier 908 compares the csc-page-buffer current from the page-buffer current sensors 902 to the csc-reference current from the page reference current sensor 906.

In one embodiment, the CSC circuit 900 is designed and configured in such a way that the csc-page-buffer current is directly proportional to the number of fail cells for a particular program-verify level being tested, and the csc-reference current is directly proportional to the configurable number of tolerable fail bits set for example by the trim established with VREF from the variable voltage supply 904, as shown in FIG. 9.

Accordingly, the power consumption for the CSC operation is proportional to the number of fail cells as well as the number of tolerable fail bits.

According to the inventive scheme, during the CSC data-setup, only the information of one group (e.g., 50%) of the program-verify fail cells (e.g., any one of odd and even groups of the program-verify fail cells) of a specific program-verify level is placed on one of the page-buffer nodes 92 connected to the comparator circuit 900. In this example, the 50% of the program-verify fail cells is obtained by masking the other one of the odd and even groups respectively coupled to odd or even page-buffers such that the group masked does not contribute to Page-Buffer Current during the CSC operation. Similarly, during the CSC reference-setup, a configurable reference bit count (from 0 to 63) is also set to a roughly 50% less value. In one embodiment, by masking ODD or EVEN groups, only 50% of total cells are evaluated by Page-Buffer Current during the CSC operation. This means that only 50% of total failing cells is the criterion for fall/pass. In order to match this criterion, the CSC reference bit count would be configured to the roughly 50% less value. Other values than 50% may be used based on silicon data and characterization of the memory cell groups being evaluated.

As a result, both the csc-page-buffer current and the csc-reference current will be reduced by roughly 50% due to the reduction in the number of program-verify fail bits and the reference bits. Hence overall power consumption for the CSC operation may be improved by up to 50% in this example.

For the cases where the precision is crucial in fail detection, the inventive scheme in one embodiment can be used to sequentially perform the CSC operation on the odd and even groups in order to double the CSC fail detection capability without compromising the granularity.

Figure 10:
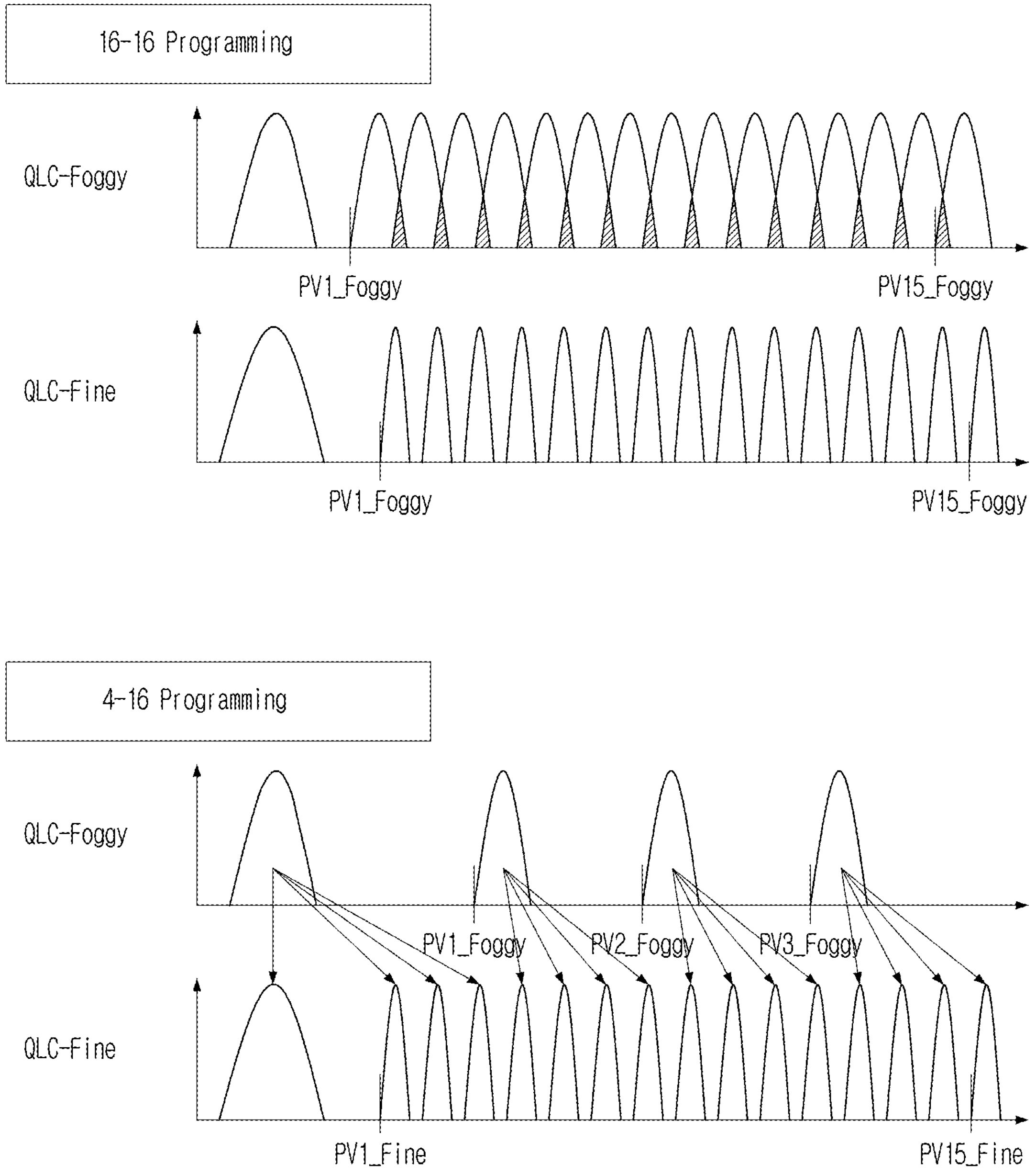
FIG. 10 is diagram of another novel in accordance with one embodiment of the present invention used to read data from a memory.

FIG. 10 illustrates the QLC foggy and fine programming with 16-16 and 4-16 algorithms. As shown, during the 4-state or 16-state foggy programming, the voltage thresholds (PV to PV15) are distributed coarsely, and the precision may not be critical in detecting the fail cells.

In this case, the CSC operation may be performed on only one (odd or even) group to save power for all the CSC operations.

However, during the 16-state fine programming where the precision is more important in detecting the fail cells for the fine placement of voltage thresholds (PV to PV15), the CSC operation may be performed on one (odd or even) group until the CSC operation passes. Only after the first group passes, the CSC operation is performed on the other one (even or odd) group to pass the particular program-verify level. This sequential testing (as noted above) still saves power because only 50% of the CSC operations are executed during each program operation. Further, in this sequential testing, the CSC operation on each group arrives at fail bit count for each group, which may be summed for a total fail bit count.

Figure 11:
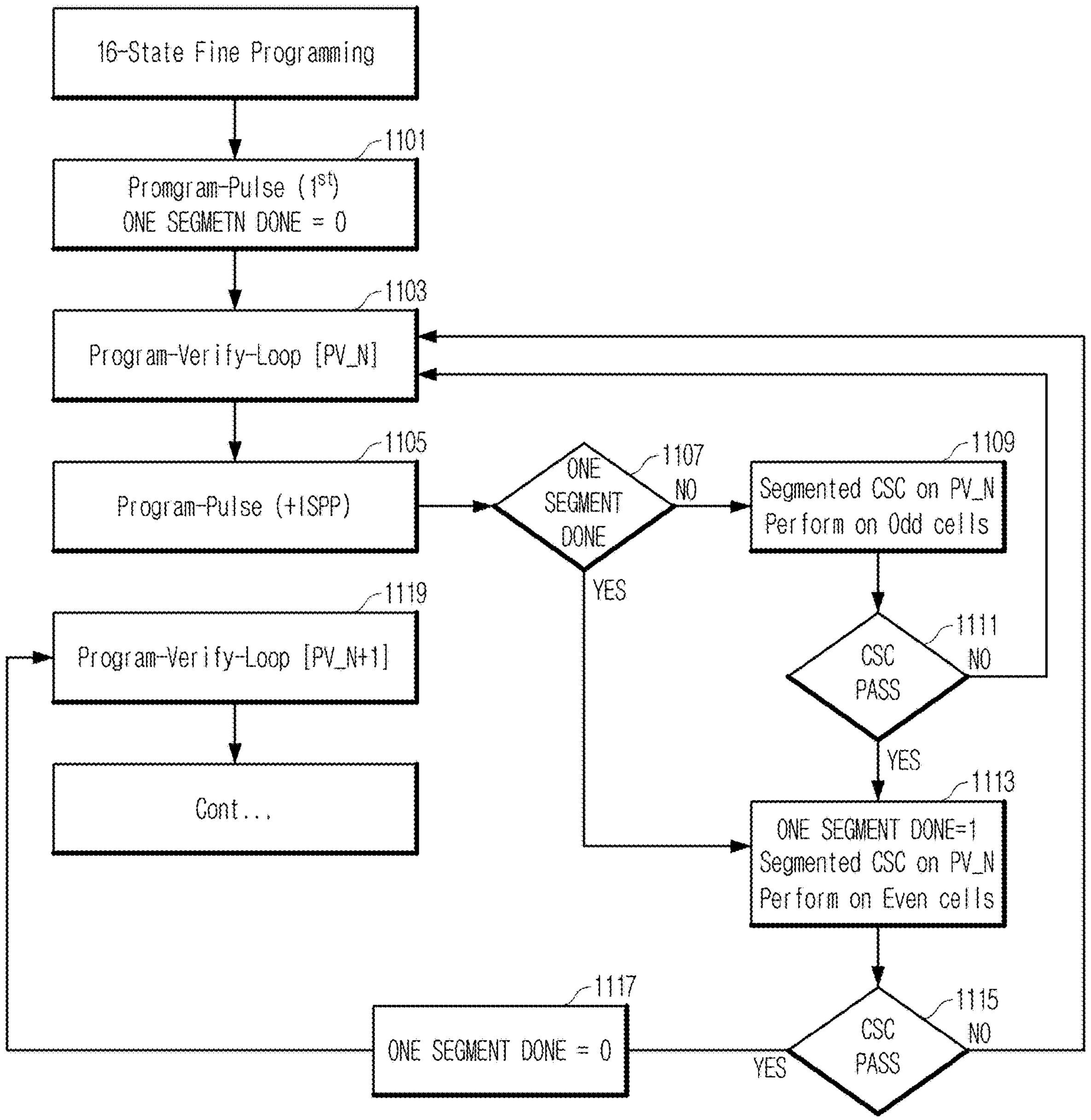
FIG. 11 is a flowchart depicting a method for operating a memory controller in accordance with one embodiment of the present invention.

FIG. 11 is a flow-chart illustrating a 16-state fine programming in accordance with one embodiment of the present invention. At 1101, a program pulse (such as shown in FIG. 8 by the first pulse P at the start bias) can be provided by voltage generation circuit 122 of FIG. 2, and then provided to the memory cells of the memory cell array 110 through address decoder 240. At 1103, the program-verify loop begins with program-verify pulses (such as shown in FIG. 8 by the PV pulses which followed the first pulse P at the start bias) being provided to the memory cells in the bit line. In particular, a pulse at the first program-verify pulse PV_N level is applied to test if the voltage threshold for the PV_N state has been established. At 1105, a subsequent program pulse (such as shown in FIG. 8 by the second pulse 802 which followed the first pulse 801) is applied. At 1107, the memory controller checks if all the memory cell have been checked for CSC or if only one segment of all the memory cells have been checked for CSC. If NO at 1107 (indicating that not all the memory cells have been checked for CSC), a CSC operation is performed at 1109 (in this example) on the odd cells of the targeted program-verify level. At 1111, the memory controller based on output from (for example from comparator circuit 900) decides if the CSC operation resulted in a "Pass" indicating that one voltage threshold for a particular program voltage level of the memory cell being programmed was properly programmed by the second pulse. IF YES at 1111, the memory controller decides at 1113 that one segment of the memory cells have been programmed and begins a CSC operation on the even cells. If NO at 1111, the process proceeds back to 1103 and reapplies a pulse with ISPP (increased step pulse program) to all non-inhibited cells.

At 1115, the memory controller determines if the CSC operation passed. If YES at 1115, at 1117, the memory controller continues to 1119 where a subsequent pulse at program-verify loop PV_N+1 is applied. If NO at 1115, the process proceeds back to 1103 and reapplies the pulse with ISPP to all non-inhibited cells.

For a given program-verify level, the first-half of the CSC operation is performed on one of the odd and even groups, which may respectively include 50% odd cells and 50% even cells, until the first-half CSC operation passes, and after the first-half CSC operation passes, the second-half CSC operation is performed on the other one of the odd and even groups.

If the second segment (even) CSC operation fails, then after the next program pulse (e.g. after pulse 802 or after pulse 803, etc.), again the second segment (even) CSC operation is performed. Once a CSC operation passes, the program-verify level is passed. For example, if the pulse-verify level PV1 takes 3 to 4 program-pulses to pass that program-verify level PV1, then under program-pulse #2, a CSC operation on PV1 will only be performed on the odd-segment. If that fails, then under the program-pulse #3, a CSC operation on PV1 will again only be performed on an odd-segment. If that passes, then under the same program-pulse #3, a CSC operation on PV1 will be performed on an even-segment. If that passes, then the algorithm completes verification that the PV1 level has been established as a proper threshold voltage for program-voltage state. If that fails, then under the program-pulse #4 a CSC operation on PV1 will only be performed on an even-segment, and when that passes the algorithm completes the establishment of PV1 as the proper threshold voltage.

According to above-described scheme, more than 50% of the CSC operations during the fine programming would be executed with either an odd segment or an even segment, resulting in power improvement, by not performing CSC operations on all the memory cells.

Table 1 represents an example of the method discussed in FIG. 11. As shown, only for pulse #3, pulse #5, and pulse #8, both the odd and even segment CSC are performed, while for all the other program-pulses, either odd or even segment CSC are performed, so out of 8 program-pulses shown, 5 program-pulses may see the power improvement from segmented CSC.

If a program-verify operation is performed with the higher program-gate-steps from one program pulse to the next, the number of cells that the next pulse with higher gate-voltage can program could be more than what the CSC circuit can support. For example, a CSC circuit may only be able to detect up to 63 fail cells per 1 KB, while the pulse with higher program-gate-steps may be capable of passing up to 96 or 127 cells per 1 KB depending on the magnitude of the gate-voltage applied. In this case, the CSC algorithm becomes the limiter and costs the tPROG time by issuing an additional verify step for that particular level which otherwise could have been avoided.

As the segmented CSC method allows to effectively extend the range of CSC fail-bit check capability, the performance of higher gate-step program-operations can be improved. For example, with this method applied, an SLC 2P-2V program may now be completed in 2P-1V, and a TLC last level program that typically takes multiple program pulses may now be completed with one less program-voltage level verification.

TABLE 1

| Pulse# | CSC-ODD | CSC-EVEN | Level Pass |
|---|---|---|---|
| 1 | PV1 (fail) | skip | |
| 2 | PV1 (fail) | skip | |
| 3 | PV1 (pass) | PV1 (pass) | PV1 |
| 4 | PV2 (fail) | skip | |
| 5 | PV2 (pass) | PV2 (fail) | |
| 6 | skip | PV2 (pass) | PV2 |
| 7 | PV3 (fail) | skip | |
| 8 | PV3 (pass) | PV3 (pass) | PV3 |
| . | . | . | . |
| . | . | . | . |
| . | . | . | . |

Figure 12:
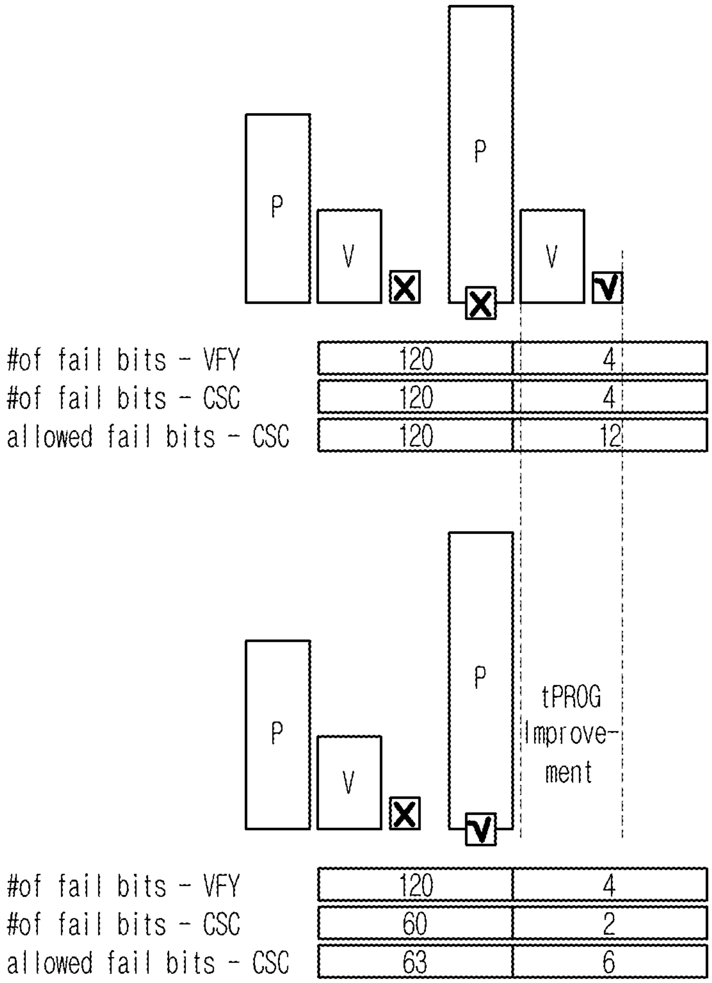
FIG. 12 is a diagram illustrating an SLC program case in accordance with one embodiment of the present invention.

FIG. 12 is a diagram illustrating an SLC program case in accordance with one embodiment of the present invention where the extended CSC fail detection capability is used to improve the program performance.

In this example, with a segmented CSC operation, a 2-Pulse-2-Verify program operation can now be completed with 2-Pulse-1-Verify operation, saving 1-Verify of program time.

SLC programming has higher margin between the erase state and program state because of only 2 program states, and therefore the SLC programming may be performed with a higher program-pulse-start-bias and with higher program-gate-steps (between each program pulse) compared to those used for multi-level cells, and thereby can achieve a faster program time.

Due to the higher program-gate-steps (higher steps between pulses 801, 802, 803, etc.), the 2nd program pulse may be capable of programming more cells successfully than the CSC circuit can detect. For example, a program pulse with higher ISPP (higher step between two pulses) may program more cells than a pulse with lower ISPP. In this case, an additional program-verify level followed by another CSC operation is executed to complete the SLC programming. The inventive scheme in one embodiment a) extends the CSC fail detection capability for the number of fail cells that the CSC can detect and b) increases the probability of the same SLC programming can be completed with a 2-Pulse-1Verify operation.

FIG. 12 illustrates such case where, after the first program pulse, only 120 cells per 1 KB chunk fail the program-verify operation. A second program pulse with higher gate-steps could then place those fail cells to a targeted program state. However, due to the detection limitation of the CSC circuit (only up to 63 allowed fail bits), the CSC operation fails and an addition program-verify is performed. With segmented CSC, even though number of program-verify failing cells are 120 per 1 KB chunk, only half of those are considered during the CSC-operation and hence 60 (# of fail bits–CSC) are compared against the CSC-criteria of 63 (allowed fail bits–CSC), as result CSC passes and program completes with 2-Pulse-1-Verify saving the 1-Verify worth of tPROG time. In one embodiment, by segmenting, an estimate of the total number of fail bits can be made by doubling the value of those 60 fail bits actually measured in the segment, and arriving at an estimate of 120 fail bits for the total fail bits. In this example, a scaling factor of 2 (defined by a ratio a total number of the memory cells to a number of the memory cells in the first segmented group) is used to estimate from the fail bits actually measured in the segment the total fail bits.

Accordingly, the segmented CSC method has significant impact when it comes to saving power and performance, in addition to that, it can reduce the CSC circuits from 16 copies to 8 copies which further translates into die-size reduction.

The inventive scheme in one embodiment for the CSC operations can improve the power consumption by up to 50% and expand the CSC fail detection capability by 2× for effectively checking a greater number of fail cells without any need of increasing the physical size of the CSC circuit. The inventive scheme is compatible with NAND operations that use CSC-algorithms. (e.g., program, read, erase, etc.).

The inventive scheme in one embodiment improves the die-size criteria by reducing the required number of current-sense-comparators for the CSC operations. If the inventive scheme is used for all the CSC operations, the number of current-sense-comparator circuits can be reduced by 50%.

The segments can either be two (50% of the cells—odd & even) or four (25% of the cells—dedicated quarter) depending on the implementation and the need for the CSC operation to have further power and performance benefits (e.g., up to 75% power improvement, and 4× CSC fail detection capability). When there are four segments, a scaling factor of 4 would provide an estimate of the total fail bits from the number of fail bits measured in one of the four segments. Alternatively, if the four segments were sequentially subject to CSC operation, a total number of fail bits could be obtained by summing the respective fail bits measured in each segment.

The segment selection (odd or even) may be done using a trim-register for more flexibility. For example, when to perform CSC on ODD cells group versus when to perform CSC on EVEN cells group may be configured by a trim-register based on silicon data and characterization of the memory cell groups.

Operational Methods

Figure 13:
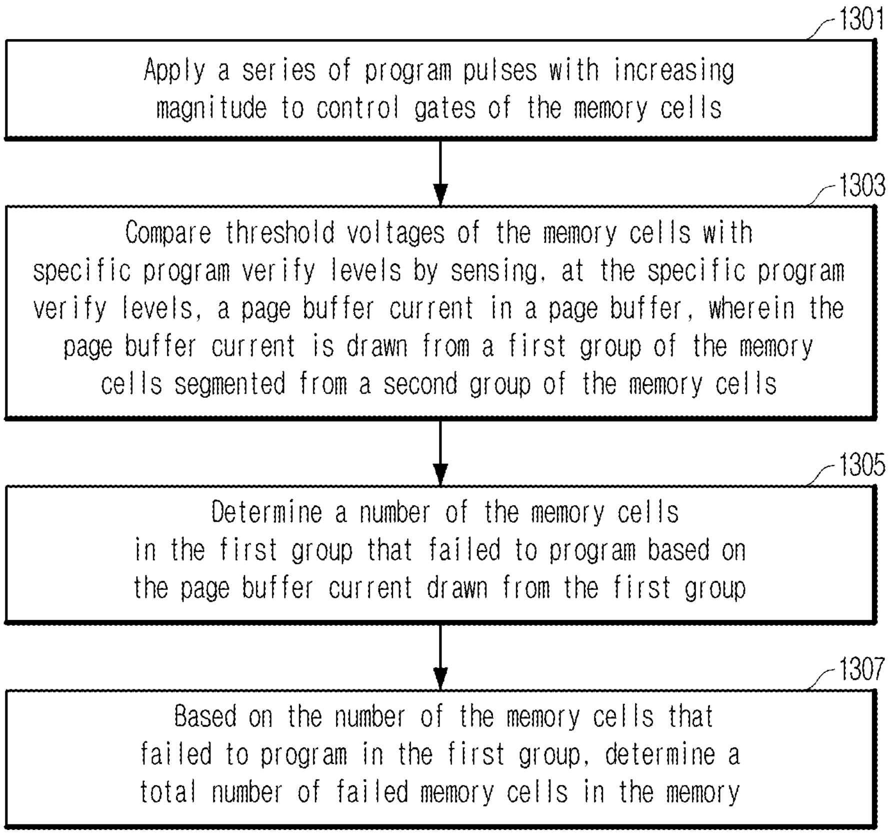
FIG. 13 is a flowchart depicting a method in accordance with one embodiment of the present invention for programming memory cells in a memory.

FIG. 13 is a flowchart depicting a method in accordance with one embodiment of the present invention for programming memory cells in a memory. A memory controller such as memory controller 200 in FIG. 1 or memory controller 200 in FIG. 5 can be used to execute this method. As illustrated in FIG. 13, at 1301, the method applies a series of program pulses with increasing magnitude to control gates of the memory cells. At 1303, the method compares threshold voltages of the memory cells with specific program verify levels by sensing, at the specific program verify levels, a page buffer current in a page buffer, wherein the page buffer current is drawn from a first group of the memory cells segmented from a second group of the memory cells. At 1305, the method determines a number of the memory cells in the first group that failed to program based on the page buffer current drawn from the first group. At 1307, the method, based on the number of the memory cells that failed to program in the first group, determines a total number of failed memory cells in the memory.

In one aspect of this method, the method (in determining the number of the memory cells in the first group that failed to program) compares in a comparator the page buffer current to a reference current set by a trim voltage level in the comparator such that the reference current is directly proportional to a detectable number of allowed fail bits, wherein the page buffer current exceeding the reference current indicates a failure to program.

In one aspect of this method, the method (in determining the total number of failed memory cells) multiplies the number of the memory cells in the first group that failed to program by a scaling factor defined by a ratio a total number of the memory cells to a number of the memory cells in the first group.

In one aspect of this method, the method compares the threshold voltages of the memory cells with the specific program verify levels by sensing, at the specific program verify levels, the page buffer current in the page buffer drawn from the second group of the memory cells (optionally comprising a remainder of the memory cells not in the first group); and determines a number of the memory cells in the second group that failed to program based on the page buffer current drawn from the second group of the memory cells.

In one aspect of this method, the total number of the failed memory cells in the memory comprises is obtained by summing the number of the memory cells that failed to program in the first group and the number of the memory cells in the second group that failed to program.

In one aspect of this method, the method masks the second group of the memory cells such that the page-buffer current is drawn only from the first group.

In one aspect of this method, the method performs a first-part of a current sense comparison (CSC) on the first group until the first-part of the CSC operation passes.

In one aspect of this method, after the first-part of the CSC operation passes, un-mask the second group and perform a second-part of the CSC operation on the second group.

In one aspect of this method, when the second-part of the CSC operation fails, performing the second-part CSC operation again on the second group.

In one aspect of this method, once the second-part of the CSC operation passes, the method establishes the voltage threshold based on a program-verify level used for passing the second-part of the CSC operation.

Memory System

In the present invention, there is provided a memory system comprising a memory device; a page buffer; a comparator configured to sense page-buffer current and compare the page-buffer current to a reference current; and a controller in communication with and configured to control the memory device, the page buffer, and the comparator. The controller is configured to: apply a series of program pulses with increasing magnitude to control gates of the memory cells; compare threshold voltages of the memory cells with specific program verify levels by sensing, at the specific program verify levels, the page buffer current in the page buffer, wherein the page buffer current is drawn from a first group of the memory cells segmented from a second group of the memory cells; determine a number of the memory cells in the first group that failed to program based on the page buffer current drawn from the first group; and based on the number of the memory cells that failed to program in the first group, determine a total number of failed memory cells in the memory.

In one aspect of this memory system, in the comparator, the page buffer current is compared to a reference current set by a trim voltage level in the comparator such that the reference current is directly proportional to a detectable number of allowed fail bits, and the page buffer current exceeding the reference current indicates a failure to program.

In one aspect of this memory system the controller is configured to multiply the number of the memory cells in the first group that failed to program by a scaling factor defined by a ratio a total number of the memory cells to a number of the memory cells in the first group to estimate the total number of the failed memory cells in the memory.

In one aspect of this memory system the controller is configured to: compare the threshold voltages of the memory cells with the specific program verify levels by sensing, at the specific program verify levels, the page buffer current in the page buffer drawn from the second group of the memory cells (optionally comprising a remainder of the memory cells not in the first group); and determine a number of the memory cells in the second group that failed to program based on the page buffer current drawn from the second group of the memory cells.

In one aspect of this memory system the controller is configured to sum the number of the memory cells that failed to program in the first group and the number of the memory cells in the second group that failed to program to obtain the total number of the failed memory cells in the memory.

In one aspect of this memory system, the controller is configured to mask the second group of the memory cells such that the page-buffer current is drawn only from the first group.

In one aspect of this memory system, the controller is configured to perform a first-part of a current sense comparison (CSC) on the first group until the first-part of the CSC operation passes.

In one aspect of this memory system, the controller is configured to, after the first-part of the CSC operation passes, un-mask the second group and perform a second-part of the CSC operation on the second group.

In one aspect of this memory system, the controller is configured to, when the second-part of the CSC operation fails, perform the second-part CSC operation again on the second group.

In one aspect of this memory system, the controller is configured to, once the second-part of the CSC operation passes, establish the voltage threshold based on a program-verify level used for passing the second-part of the CSC operation.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A method for programming memory cells in a memory, comprising:

applying a series of program pulses to the memory cells;

comparing threshold voltages of the memory cells with specific program verify levels by sensing, at the specific program verify levels, a page buffer current in a page buffer coupled to the memory cells, wherein the page buffer current is drawn from a first group of the memory cells segmented from a second group of the memory cells;

determining a number of the memory cells in the first group that failed to program based on the page buffer current drawn from the first group; and based on the number of the memory cells that failed to program in the first group, determining a total number of failed memory cells in the memory.

2. The method of claim 1, wherein the determining the number of the memory cells in the first group that failed to program comprises comparing in a comparator the page buffer current to a reference current set by a trim voltage level in the comparator such that the reference current is directly proportional to a detectable number of allowed fail bits, wherein the page buffer current exceeding the reference current indicates a failure to program.

3. The method of claim 1, wherein the determining the total number of failed memory cells comprises estimating the total number by multiplying the number of the memory cells in the first group that failed to program by a scaling factor defined by a ratio a total number of the memory cells to a number of the memory cells in the first group.

4. The method of claim 1, further comprising:

comparing the threshold voltages of the memory cells with the specific program verify levels by sensing, at the specific program verify levels, the page buffer current in the page buffer drawn from the second group of the memory cells; and determining a number of the memory cells in the second group that failed to program based on the page buffer current drawn from the second group of the memory cells.

5. The method of claim 4, wherein the total number of the failed memory cells in the memory is obtained by summing the number of the memory cells that failed to program in the first group and the number of the memory cells in the second group that failed to program.

6. The method of claim 1, further comprising:

masking the second group of the memory cells such that the page-buffer current is drawn only from the first group.

7. The method of claim 6, further comprising:

performing a first-part of a current sense comparison (CSC) on the first group until the first-part of the CSC operation passes.

8. The method of claim 7, further comprising:

after the first-part of the CSC operation passes, unmasking the second group and performing a second-part of the CSC operation on the second group.

9. The method of claim 8, further comprising:

when the second-part of the CSC operation fails, performing the second-part CSC operation again on the second group.

10. The method of claim 9, further comprising:

once the second-part of the CSC operation passes, establishing the voltage threshold based on a program-verify level used for passing the second-part of the CSC operation.

11. A memory system comprising:

a memory device;

a page buffer;

a comparator configured to sense page-buffer current and compare the page-buffer current to a reference current;

a controller in communication with and configured to control the memory device, the page buffer, and the comparator wherein the controller is configured to:

apply a series of program pulses with increasing magnitude to control gates of the memory cells;

compare threshold voltages of the memory cells with specific program verify levels by sensing, at the specific program verify levels, the page buffer current in the page buffer, wherein the page buffer current is drawn from a first group of the memory cells segmented from a second group of the memory cells;

determine a number of the memory cells in the first group that failed to program based on the page buffer current drawn from the first group; and based on the number of the memory cells that failed to program in the first group, determine a total number of failed memory cells in the memory.

12. The memory system of claim 11, wherein, in the comparator, the page buffer current is compared to a reference current set by a trim voltage level in the comparator such that the reference current is directly proportional to a detectable number of allowed fail bits, and wherein the page buffer current exceeding the reference current indicates a failure to program.

13. The memory system of claim 12, wherein the controller is configured to multiply the number of the memory cells in the first group that failed to program by a scaling factor defined by a ratio a total number of the memory cells to a number of the memory cells in the first group to estimate the total number of the failed memory cells in the memory.

14. The memory system of claim 12, wherein the controller is configured to:

compare the threshold voltages of the memory cells with the specific program verify levels by sensing, at the specific program verify levels, the page buffer current in the page buffer drawn from the second group of the memory cells; and determine a number of the memory cells in the second group that failed to program based on the page buffer current drawn from the second group of the memory cells.

15. The memory system of claim 14, wherein the controller is configured to sum the number of the memory cells that failed to program in the first group and the number of the memory cells in the second group that failed to program to obtain the total number of the failed memory cells in the memory.

16. The memory system of claim 11, wherein the controller is configured to mask the second group of the memory cells such that the page-buffer current is drawn only from the first group.

17. The memory system of claim 16, wherein the controller is configured to perform a first-part of a current sense comparison (CSC) on the first group until the first-part of the CSC operation passes.

18. The memory system of claim 17, wherein the controller is configured to, after the first-part of the CSC operation passes, un-mask the second group and perform a second-part of the CSC operation on the second group.

19. The memory system of claim 18, wherein the controller is configured to, when the second-part of the CSC operation fails, perform the second-part CSC operation again on the second group.

20. The memory system of claim 19, wherein the controller is configured to, once the second-part of the CSC operation passes, establish the voltage threshold based on a program-verify level used for passing the second-part of the CSC operation.

* * * * *